May 23, 1944.  M. A. STANFIELD  2,349,470
BLIND FOR AUTOMOBILE WINDOWS
Filed July 5, 1941   2 Sheets-Sheet 1
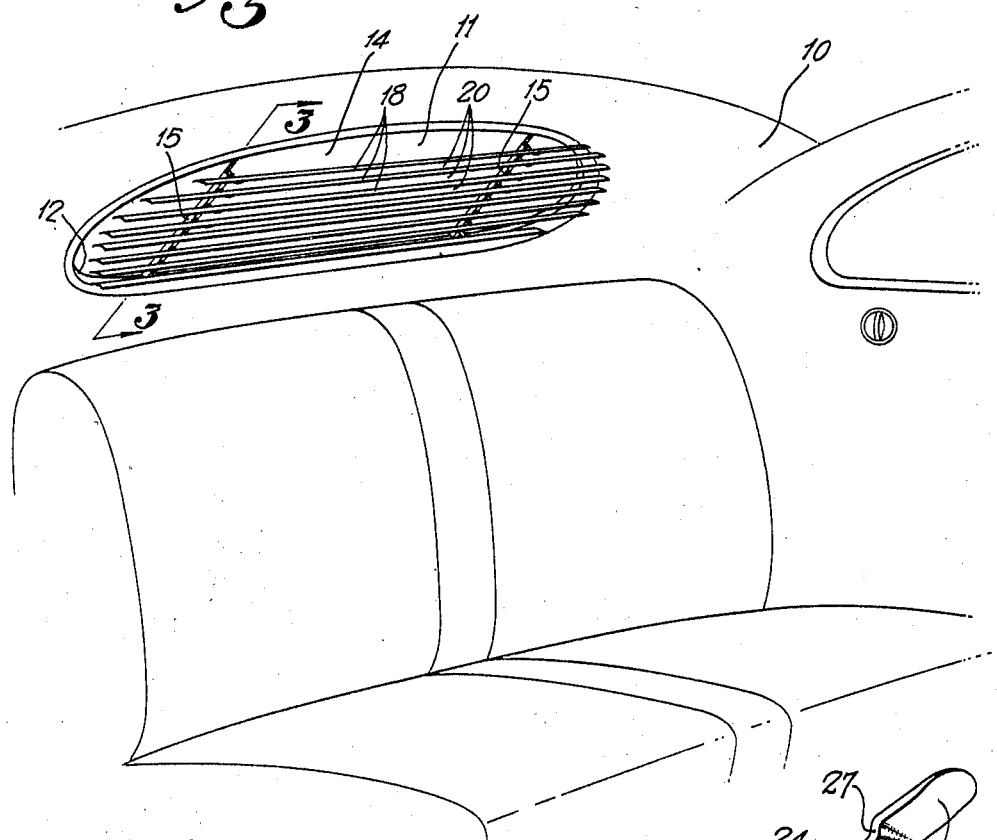
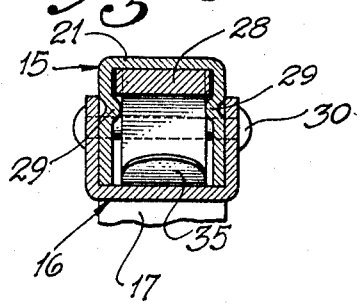
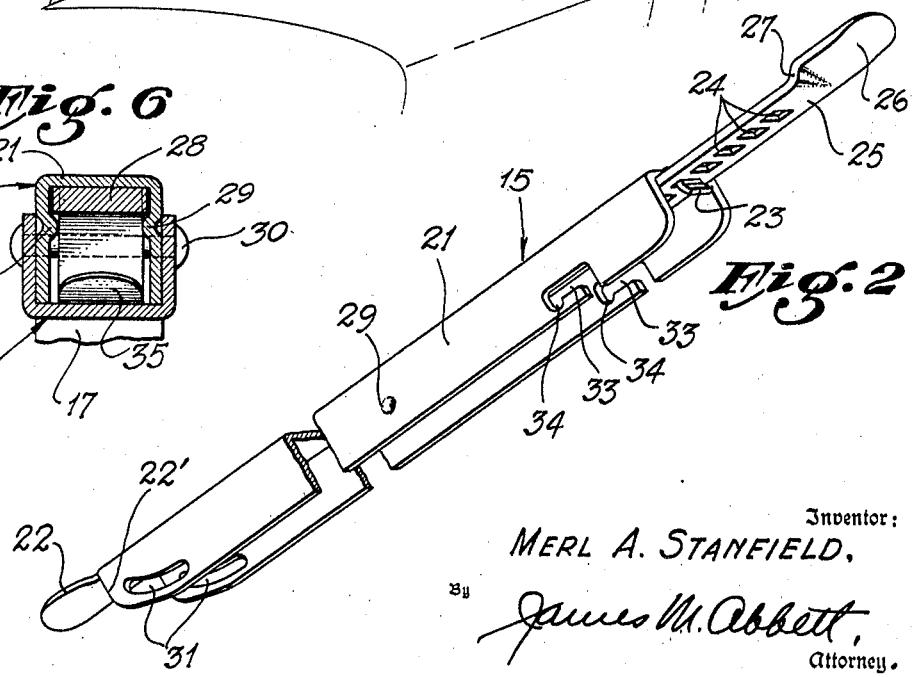
Inventor:
MERL A. STANFIELD,
By James M. Abbett,
Attorney.

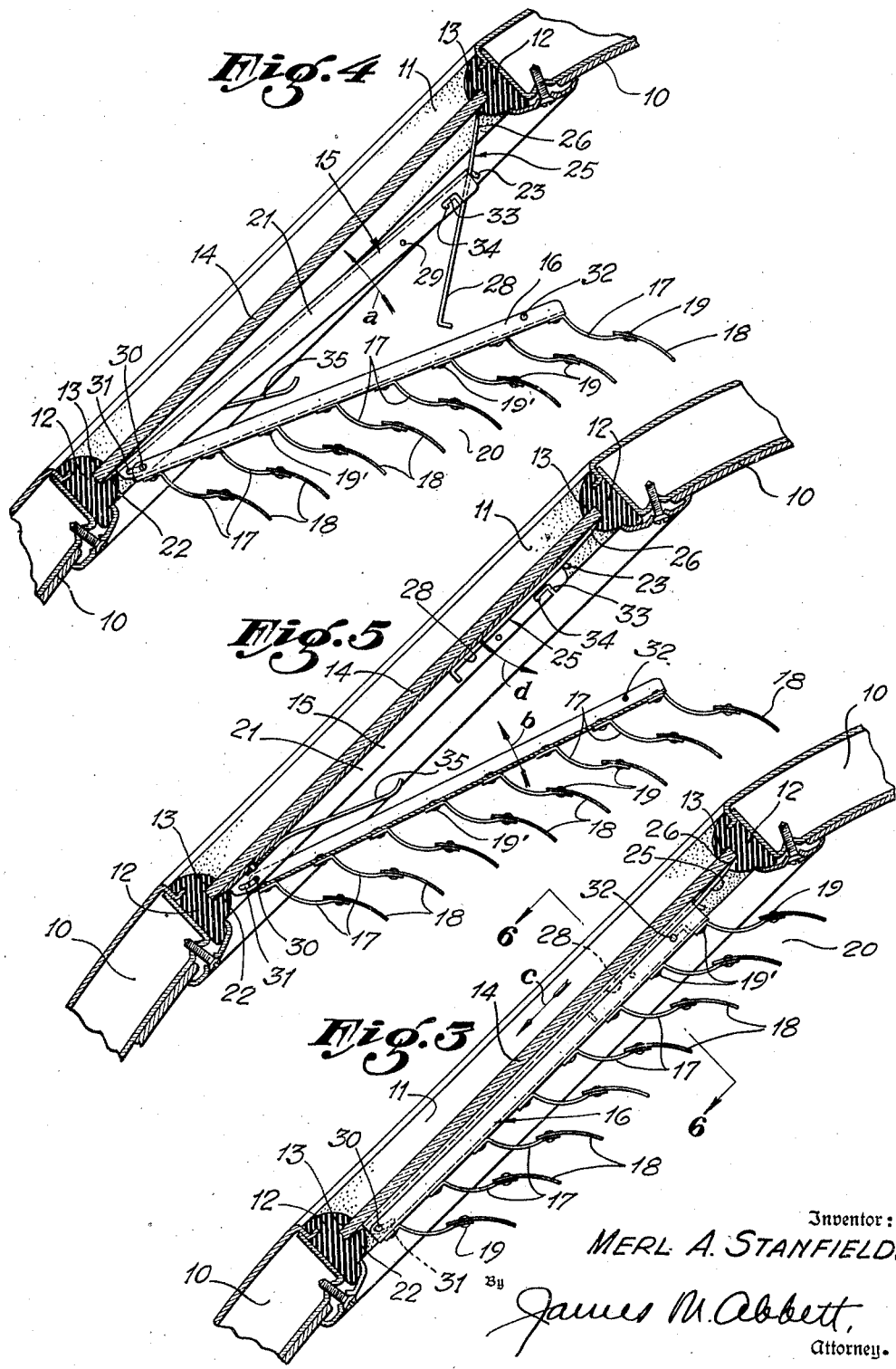

Patented May 23, 1944

2,349,470

UNITED STATES PATENT OFFICE 2,349,470

BLIND FOR AUTOMOBILE WINDOWS

Merl A. Stanfield, Bellflower, Calif., assignor to Godfrey Bell, Los Angeles, Calif., doing business under the name of Shehan Mfg. Co.

Application July 5, 1941, Serial No. 401,119

5 Claims. (Cl. 189—63)

This invention relates to a blind for automobile windows.

Automobiles of present design have bodies, the rear wall of which is inclined to the vertical and is formed with a window opening through which the driver of the car may view the highway in the rear of the car while looking into the rearsight mirror. During certain times of the day the rays of the sun will pass inwardly through this rear window and cause the car to be uncomfortably heated. When the automobile is a coupé the sun's rays may fall directly on the occupants of the vehicle and add to the discomfort. Since it is not possible to completely cover the rear window at such times to keep the sun out, it is possible to dispose a blind across the window having slats which lie in substantially parallel horizontal planes, so that the driver may observe the highway through the spaces between the slats. In windows of this type the window frame is usually made with a rubber frame element into which the edge of the window glass is set, and in some instances the glass is not flat but is slightly curved in a horizontal plane. This necessitates an adaptation of a blind structure to the particular window upon which a blind structure is mounted. Heretofore, slatted blinds have been constructed and have been mounted over the window of an automobile but these devices have been for the most part permanently mounted in such a manner as to prevent free access to the window glass on the inside of the automobile so that the glass could be easily cleaned and since these devices have embodied holding means which wedge between the rubber window strip and the frame, it is evident that repeated removal and replacement of the device would damage the strip and make it unsightly. It is the principal object of the present invention to provide a blind of the type described, which may be readily mounted in position across a window opening of an automobile and adapted to windows of different dimensions and having either flat or concaved inner faces, the said structure further embodying means whereby the blind may be quickly swung to a non-obstructing position, giving access to the surface of the window glass, and may be easily removed and replaced in its entirety.

The present invention contemplates the provision of adjustable mounting members adapted to engage the frame of a window and to sustain themselves in their fixed position, said mounting members pivotally supporting frame elements of a slatted blind, the slats of which are flexible and will readily conform to the horizontal contour of a window glass.

The invention is illustrated by way of example in the accompanying drawings, in which:

Figure 1 is a fragmentary view in perspective showing the application of the present device to the rear window of an automobile.

Fig. 2 is an enlarged view in perspective showing one of the frame and mounting elements of the blind.

Fig. 3 is a view in vertical section through the window structure as seen on the line 3—3 of Fig. 1 and shows the manner in which the blind is secured in position.

Fig. 4 is a view similar to Fig. 3 but shows the initial relationship of the parts of the blind structure prior to the final mounting of the device within the window.

Fig. 5 is a view in vertical section similar to Fig. 4 indicating the mounting element in position and showing the hinged relationship of the blind frame elements thereto.

Fig. 6 is a view in transverse section through the mounting and supporting structures as seen on the line 6—6 of Fig. 3.

Referring more particularly to the drawings, 10 indicates a fragmentary portion of the body of an automobile having a window opening 11 in its rear wall. As usually constructed, this window opening is formed with a rubber frame element 12 having a groove 13 therein. This groove receives the window glass 14. The frame is secured in position by molding elements held by screws. The present invention is designed to be mounted within the automobile and in a sun shielding position across the window opening. The blind with which the present invention is concerned is here shown as comprising two mounting units 15 to which are pivoted two vertical frame elements 16. The frame elements 16 in turn are fitted with brackets 17 upon which blind slats 18 are fastened by rivets 19. These slats are preferably made of metal and are arcuate in cross-section and are disposed with their convexed faces presented upwardly to deflect and diffuse the sun's rays and heat rays from pursuing a direct path into the car. They are capable of flexible action so that they will readily conform themselves to the horizontal contour of the window glass 14. As shown in Fig. 3 of the drawings, the slats are supported so that they will be substantially horizontal. This causes a horizontal space 20 to occur between contiguous slats so that the driver of the automobile may have an unobstructed view when looking into the rearsight mirror and backwardly along the highway. In view of the fact that windows have a different vertical width, the mounting unit 15 is provided with adjustment. The mounting unit 15, as shown in Fig. 2 of the drawings, comprises a rigid channel shaped body element 21. This element is formed with a projection 22 at its lower end. The projection 22 is a continuation of the web of the channel. At the opposite end of the body member 21 from that of the projection 22 is a tang 23 which is also formed from the web of the channel but is of relatively narrow width. This tang is bent substantially at right angles to the length of the channel web and may project through one of a series of rectangular perforations 24 in a toggle bar 25. The outer end of the toggle bar is formed with a member 26 comparable to the member 22 previously described. The members 22 and 26 are intended to be forced into position with relation to the frame structure 12 and will lie against the face of the window glass 14, as indicated in Figs. 2 and 3 of the drawings. In cases where the window glass 14 has an inner concaved horizontally extending face, it may be desirable to give a twist to the members 22 and 26, as indicated at 27, so that the slats of the blind may be properly supported.

As shown in Fig. 4 of the drawings, the toggle member 25 has an extension 28, which may swing into the channel of the body member 21 when the mounting structure moves from the "broken" position shown in Fig. 4 to the locked position shown in Fig. 5. Protrusions 29 are formed in the side walls of the legs of the channel 21 to provide a lock for the portion 28 of the toggle bar, as particularly shown in Fig. 6 of the drawings. Pivotally mounted and adjacent to the lower end of each of the mounting units 15 is the blind frame element 16. The frame elements 16 are channel shaped. The legs of the channels of these elements straddle the body members 21 of the mounting units 15 and assume a nested position with relation thereto, as indicated in Fig. 6 of the drawings. The lower ends of these members are provided with pivot pins 30 which extend transversely through the legs of the channel members 16 and 21. The pins 30 are rigid with relation to the member 16 but are mounted in arcuate slots 31 in the legs of the body member 21. By this arrangement a pivotal connection is made between the members 21 and 16 while allowing relative longitudinal movement of these members when in their nested positions. Mounted at the free end of each of the members 16 is a lock pin 32. This pin may pass into bayonet slots 33 formed in the side flanges of the body member 21 so that the members 16 and 21 may be locked together when in their folded and nested position. The longitudinal portions of the bayonet slots 33 extend downwardly and terminate in a lock groove 34 into which the pin 32 will be held by a leaf spring 35. This spring is fixed within the channel of the body member 21 and will bear against the web portion of the channel of the blind frame member 16, thus holding the members 16 and 21 together and allowing them to be instantly released.

In operation of the present invention the structure is assembled as generally indicated in Fig. 1 of the drawings. When it is to be mounted within a window opening, such as the window opening 11, the members 22 are forced into the groove 13 occupied by the lower edge of the window glass 14. In view of the fact that the frame element 12 is usually made of rubber it will be evident that the rubber will be forced outwardly to accommodate the end 22. At the same time an estimate is made of the combined length of the body member 21 and the portion of the toggle bar 25 which extends beyond the tang 23. The tang 23 is then placed in an appropriate slot 24 and the end of the extension portion 26 of the toggle bar 25 is placed against the inner face of the glass 14 and the edge of the groove 13 at the top of the window frame. The lock bar is then forced toward the window frame in the direction of the arrow a, as shown in Fig. 4. This will cause a toggle action to take place so that the members 22 and 26 will be forced into the grooves 13 of the frame and alongside the glass 14. As this takes place the extension portion 28 of the toggle bar 25 will swing inwardly to a position between the flanges of the channel represented by the body member 21 of the mounting 15 until the portion 28 is forced between the protrusions 29 so that the member 28 will be held as shown in Fig. 6. When this has been accomplished the mounting structure, including two or four of the units 15, will be firmly secured in position to support the blind until such time as it is desired to release the mounting structure and remove the blind from the window. After the mounting units 15 have been adjusted and set, as shown in Fig. 5 of the drawings, the blind frame element 16 may be swung upwardly in the direction of the arrow b, as indicated in Fig. 5, to assume their final position, as shown in Fig. 3 of the drawings. When the members 16 are swung upwardly they will assume nested positions with relation to the members 21, as shown in Fig. 6 of the drawings. After this movement has been made the members 16 may be moved downwardly as in the direction of the arrow c, as indicated in Fig. 3 of the drawings. This will be accommodated by the arcuate slots 31 and will cause the pins 32 to move along the bayonet slots 33 to the lock seats 34. When pressure is released the springs 35 will act to force the members 16 outwardly and in a counter direction to the arrow b in Fig. 5 and will hold the pins 32 in their locked seats 34.

It will be evident that when it is desired to gain access to the inner surface of the window, such for example as when it is to be washed, that a slight movement of the members 16 in a direction counter to that indicated by the arrow c in Fig. 3 will release the members 16 and permit them to swing outwardly and downwardly in a counter direction to that indicated by the arrow b in Fig. 5. It will also be evident that if it is desired to remove the entire blind structure bodily, this may be done when the members 16 are in the position shown in Fig. 5, by swinging the free ends 28 of the toggle bars 25 in the direction indicated by the arrow d in Fig. 3. This will "break" the toggle joint and cause the members 21 and 25 to assume the position indicated in Fig. 4, at which time the structure may be easily removed.

It may be desirable to taper the projecting tang 22 so that it will more easily move to a seated position. It is also desirable that the side flanges of the channel 22 shall form a shoulder 22' which rests against the member 12 at the lower end of the channel 22.

Attention is directed to the fact that the bracket portions 17 which support the individual slats 18 are secured to the slats by the rivets 19 and that angle ends of the bracket portions are secured to the frame element 16 by rivets 19'. The rivets 19 and 19' do not tightly clamp the elements through which they pass so that there might be slight swinging movement on the rivets in the event the slats are struck. This will permit the slats to slightly flex without becoming bent or permanently deformed.

It will thus be seen that the device here disclosed provides a slatted blind for windows, particularly of the type used in automobiles, and which structure may be quickly mounted in position without the use of any external fastening means and without in any wise marring the parts of the automobile body; and that furthermore the device may be easily adapted to windows of different sizes and contours, and that access may be instantly had to the inner surface of the window glass without necessitating the unfastening of permanently placed parts.

While I have shown the preferred form of my invention as now known to me, it will be understood that various changes may be made in combination, construction and arrangement of parts by those skilled in the art without departing from the spirit of my invention as claimed.

Having thus described my invention, what I claim and desire to secure by Letters Patent is:

1. In combination with a window frame within which a pane of glass is mounted and which frame carries a deformable portion within which the edge of the glass is directly seated, a slatted blind structure including mounting units comprising a pair of rigid members articulately connected intermediate their free ends, the free ends being designed to be forced between the surface of the window glass and the deformable frame member, said mounting units having a toggle action so that when the sections of each unit are moved in longitudinal alignment the ends of the sections will move oppositely to a seated position, means for latching said sections in said longitudinally aligned position, a blind carried by said mounting units and pivoted thereto along the lower edge thereof, and means embodied in the articulate connection between the elements of the mounting units permitting adjustable variation in the length of said mounting units.

2. A slatted blind structure for automobile windows, comprising a set of parallel mounting units, each including two rigid members pivoted together at a point intermediate the end of a unit and adapted to permit the sections to lie in longitudinal alignment as the free ends of the sections are forced into positive engagement with the frame of an automobile window, means on one of said sections nesting in a channel of the other section, means for locking the sections in their longitudinally aligned position when thus nested, channel frame members, one for each of said mounting units, means pivotally connecting one end of a frame member to an end of the mounting unit, whereby said frame members may swing to a position disposing the mounting unit in the channel thereof, said pivotal connection permitting relative longitudinal movement of the channel frame members in relation to their respective mounting units, means acting upon relative longitudinal movement of the mounting unit and the frame latching the mounting unit and its frame member in said nested position, and a blind carried by the frame members.

3. A blind structure comprising parallel supporting elements, a plurality of blind slats disposed transversely thereof, brackets secured to the slats and rotatably around axes at right angles to the length of the supporting elements, and fastening means holding the brackets and the slats face to face and permitting the slats and brackets to have articulate movement around the axes of said fastening means.

4. In combination with an automobile window frame within which a pane of glass is mounted and which frame carries a rubber gasket within which the edge of the glass is directly seated, blind mounting units disposed adjacent the opposite ends of the window frame and comprising a channel element formed at one end with a prong to be inserted between the window glass and the gasket, the opposite end of the said channel being formed with a pivot tang, a toggle extension formed with a plurality of slots longitudinally spaced to selectively receive said tang, one end of said toggle member having a prong adapted to be imbedded between the glass and the gasket and the opposite end swinging between the legs of said channel.

5. The structure of claim 4 including means temporarily locking said toggle member in said last named position.

MERL A. STANFIELD.